(12) United States Patent
Esmailzadeh

(10) Patent No.: US 11,074,639 B2
(45) Date of Patent: *Jul. 27, 2021

(54) CLOUD-BASED ITEM STORAGE SYSTEM

(71) Applicant: Arash Esmailzadeh, Los Angeles, CA (US)

(72) Inventor: Arash Esmailzadeh, Los Angeles, CA (US)

( * ) Notice: Subject to any disclaimer, the term of this patent is extended or adjusted under 35 U.S.C. 154(b) by 43 days.

This patent is subject to a terminal disclaimer.

(21) Appl. No.: 16/541,339

(22) Filed: Aug. 15, 2019

(65) Prior Publication Data

US 2019/0370884 A1  Dec. 5, 2019

Related U.S. Application Data

(63) Continuation of application No. 15/187,607, filed on Jun. 20, 2016, now Pat. No. 10,387,943, which is a (Continued)

(51) Int. Cl.
*G06Q 30/06* (2012.01)
*H04L 12/58* (2006.01)
(Continued)

(52) U.S. Cl.
CPC ....... *G06Q 30/0633* (2013.01); *G06F 3/0683* (2013.01); *G06F 3/0689* (2013.01); *G06F 16/9535* (2019.01); *G06F 21/62* (2013.01); *G06Q 30/0246* (2013.01); *G06Q 30/0629* (2013.01); *G06Q 30/0631* (2013.01);
(Continued)

(58) Field of Classification Search
CPC ........... G06F 16/9535; G06F 17/30867; G06F 21/62; G06F 3/0683; G06F 3/0689; G06Q 30/0246; G06Q 30/0629; G06Q 30/0631; G06Q 30/0633; G06Q 50/01; H04L 51/32; H04L 63/083; H04L 63/105;
(Continued)

(56) References Cited

U.S. PATENT DOCUMENTS 6,711,419 B1  3/2004 Mori
6,813,604 B1  11/2004 Shih et al.
(Continued)

FOREIGN PATENT DOCUMENTS

CN  105190592 A  12/2015
EP  2091254  8/2009

OTHER PUBLICATIONS

U.S. Appl. No. 13/717,953, "Final Office Action", dated Jun. 17, 2015, 25 pages.
(Continued)

*Primary Examiner* — Theodore C Parsons
(74) *Attorney, Agent, or Firm* — Kilpatrick Townsend & Stockton LLP

(57) ABSTRACT

A system for storing items may include a storage location comprising a scanner that is positioned to scan codes from packaging of items as they are placed into the storage location or removed from the storage location, a cloud storage system that maintains a list of items in the storage location, wherein the cloud storage system is programmed to receive, from the storage location, the list of items in the storage location; and a trash bin comprising a scanner that is positioned to scan codes from the packaging of items as they are placed into the trash bin.

20 Claims, 11 Drawing Sheets

Related U.S. Application Data continuation of application No. 14/048,248, filed on Oct. 8, 2013, now Pat. No. 9,374,422, which is a continuation-in-part of application No. 13/717,953, filed on Dec. 18, 2012, now Pat. No. 9,167,038.

(51) Int. Cl.

| | | |
|---|---|---|
| *G06Q 30/02* | (2012.01) | |
| *G06Q 50/00* | (2012.01) | |
| *H04L 29/08* | (2006.01) | |
| *H04L 9/08* | (2006.01) | |
| *H04L 29/06* | (2006.01) | |
| *G06F 3/06* | (2006.01) | |
| *G06F 21/62* | (2013.01) | |
| *G06F 16/9535* | (2019.01) | |
| *H04W 4/80* | (2018.01) | |
| *H04W 84/12* | (2009.01) | |
| *H04W 88/02* | (2009.01) | |

(52) U.S. Cl.
CPC ............. *G06Q 50/01* (2013.01); *H04L 9/085* (2013.01); *H04L 51/32* (2013.01); *H04L 63/083* (2013.01); *H04L 63/105* (2013.01); *H04L 67/1097* (2013.01); *H04W 4/80* (2018.02); *H04W 84/12* (2013.01); *H04W 88/02* (2013.01)

(58) Field of Classification Search
CPC ...... H04L 67/1097; H04L 9/085; H04W 4/80; H04W 84/12; H04W 88/02
See application file for complete search history.

(56) References Cited

U.S. PATENT DOCUMENTS

| | | | |
|---|---|---|---|
| 7,203,648 | B1 | 4/2007 | Ostermann et al. |
| 8,533,144 | B1* | 9/2013 | Reeser ................ G06Q 30/02 706/47 |
| 8,640,257 | B1 | 1/2014 | Sherrets et al. |
| 9,167,038 | B2 | 10/2015 | Esmailzadeh |
| 10,387,943 | B2 | 8/2019 | Esmailzadeh |
| 2002/0082925 | A1 | 6/2002 | Herwig |
| 2002/0143860 | A1* | 10/2002 | Catan ................. G06K 19/0723 709/203 |
| 2002/0178066 | A1 | 11/2002 | Roh et al. |
| 2003/0070077 | A1 | 4/2003 | Redlich et al. |
| 2003/0167408 | A1 | 9/2003 | Fitzpatrick et al. |
| 2003/0208694 | A1 | 11/2003 | Fang |
| 2004/0064729 | A1 | 4/2004 | Yellepeddy et al. |
| 2004/0093379 | A1 | 5/2004 | Roh et al. |
| 2006/0210028 | A1 | 9/2006 | Ng |
| 2007/0160197 | A1 | 7/2007 | Kagaya et al. |
| 2008/0013712 | A1 | 1/2008 | Gopinath |
| 2008/0168135 | A1 | 7/2008 | Redlich et al. |
| 2008/0214157 | A1 | 9/2008 | Ramer et al. |
| 2008/0275867 | A1 | 11/2008 | Hollemans et al. |
| 2008/0276315 | A1 | 11/2008 | Shuster |
| 2008/0294911 | A1 | 11/2008 | Nguyen et al. |
| 2008/0301775 | A1 | 12/2008 | Ollikainen et al. |
| 2009/0265257 | A1 | 10/2009 | Klinger et al. |
| 2009/0327047 | A1 | 12/2009 | Sussman |
| 2010/0036926 | A1 | 2/2010 | Ahart et al. |
| 2010/0169363 | A1 | 7/2010 | Gaedcke |
| 2010/0218128 | A1 | 8/2010 | Bonat et al. |
| 2010/0250592 | A1 | 9/2010 | Paquet et al. |
| 2011/0173676 | A1 | 7/2011 | Peckover et al. |
| 2011/0179271 | A1 | 7/2011 | Orsini et al. |
| 2011/0302098 | A1 | 12/2011 | Yoshida et al. |
| 2012/0042162 | A1 | 2/2012 | Anglin et al. |
| 2012/0066752 | A1 | 3/2012 | Vysogorets et al. |
| 2012/0084151 | A1 | 4/2012 | Kozak et al. |
| 2012/0110088 | A1 | 5/2012 | Su et al. |
| 2012/0131020 | A1 | 5/2012 | Nitz et al. |
| 2012/0190386 | A1 | 7/2012 | Anderson |
| 2012/0222093 | A1 | 8/2012 | Badenes et al. |
| 2012/0324242 | A1 | 12/2012 | Kirsch |
| 2013/0041755 | A1 | 2/2013 | Ivanov et al. |
| 2013/0041781 | A1 | 2/2013 | Freydberg |
| 2013/0052616 | A1 | 2/2013 | Silverstein et al. |
| 2013/0066962 | A1 | 3/2013 | Scherzinger et al. |
| 2013/0159732 | A1 | 6/2013 | Leoutsarakos |
| 2014/0040043 | A1 | 2/2014 | Barron et al. |
| 2014/0040624 | A1 | 2/2014 | Resch et al. |
| 2014/0052573 | A1 | 2/2014 | Oh et al. |
| 2014/0115712 | A1 | 4/2014 | Powell et al. |
| 2014/0325612 | A1 | 10/2014 | Kuehr-McLaren et al. |
| 2016/0379291 | A1 | 12/2016 | Esmailzadeh |

OTHER PUBLICATIONS

U.S. Appl. No. 13/717,953, "Non-Final Office Action", dated Jan. 16, 2015, 49 pages.
U.S. Appl. No. 13/717,953, "Notice of Allowance", dated Sep. 2, 2015, 23 pages.
U.S. Appl. No. 14/048,248, "Final Office Action", dated Feb. 2, 2016, 14 pages.
U.S. Appl. No. 14/048,248, "Non-Final Office Action", dated Jun. 26, 2015, 38 pages.
U.S. Appl. No. 14/048,248, "Notice of Allowance", dated Mar. 31, 2016, 8 pages.
U.S. Appl. No. 15/187,807, "Non-Final Office Action", dated Sep. 10, 2016, 18 pages.
U.S. Appl. No. 15/187,607, "Notice of Allowance", dated Apr. 3, 2019, 16 pages.
CN201380073248.4, "Office Action", dated Feb. 17, 2017, 10 pages.
EP13864555.1, "Extended European Search Report", dated Jun. 14, 2016, 14 pages.
EP13864555.1, "Office Action", dated Feb. 15, 2018, 9 pages.
Garay, et al., "Secure distributed storage and retrieval", Theoretical Computer Science, vol. 243, issue 1-2, Jul. 2000, pp. 363-389.
Iyengar, et al., "Design and Implementation of a Secure Distributed Data Repository", Proc. of the 14th IFIP Intl. Information Security Conf, 1998.
Le-Hung, et al., "Enabling Secure Secret Sharing in Distributed Online Social Networks", Computer Security Applications Conference, 2009, 10 pages.
Lui, "Automation in Home Appliances", Nof S. (eds) Springer Handbook of Automation. Springer, Berlin, Heidelberg (2009) (Year: 2009), 2009, pp. 1469-1483.
Rouillard, "The Pervasive Fridge a Smart Computer System Against Uneaten Food Loss", Seventh International Conference on Systems (ICONS2012), Saint-Gilles, Rèunion, Feb. 2012, pp. 135-140.
Rutledge, et al., "Clarifying the Internet of Things by Defining the Internet of Devices", ACM, 2010, 34 pages.
Sreenivaasan, et al., "Security as a Service—Securing User data by Coprocessor and by Distributing data", Trendz in Information Sciences & Computing, Dec. 19, 2010, pp. 152-155.
Tunia, "Distributed Social Network—data security", Annales Universitatis Mariae Curie-Sklodowska, Sectio AI, Informatica vol. 12, 2012, pp. 113-122.
Wylie, et al., "Survivable information storage systems", IEEE Computer, 33(8), Aug. 2000, pp. 61-68.
International Report of Patentability of PCT/US2013/070961 dated Jun. 23, 2015, all pages.
International Search Report and Written Opinion of PCT/US2013/070061 dated Mar. 27, 2014, all pages.
Dissent in Numbers: Making Strong Anonymity Scale, David Kolinsky, et al. Yale University and Aaron Johnson, U.S. Naval University, pp. 1-14.
Jose Rouillard. The Pervasive Fridge. A smart computer system against uneaten food loss. Seventh International Conference on Systems (ICONS2012), Feb. 2012. Saint-Gilles, Reunion. pp. 135-140, 2012. (Year: 2012).

(56) References Cited

OTHER PUBLICATIONS

Lui T.J. (2000) Automation in Home Appliances. In: Nof S. (eds.) Springer Handbook of Automation. Springer, Berlin, Heidelberg 2009) (Year: 2009).
Rutledge, Clarifying the Internet of Things, ACM (2010) (Year: 2010).

* cited by examiner

Log In:

```
┌─────────────────────────────────────┐
│         WELCOME PAGE                │
│                                     │
│                                     │
│  Email:                             │
│                                     │
│  Password:                          │
│                                     │
│                                     │
└─────────────────────────────────────┘
```
— 20
— 21

Search by Email or Name,

```
┌─────────────────────────────────────┐
│  HOME PAGE                          │
│                                     │
│              ┌──────────────────┐   │
│              │ SEARCH FOR PEOPLE│   │
│              └──────────────────┘   │
│                                     │
│                                     │
│     *ALL REGISTERED PERSONAL DATA*│
│                                     │
└─────────────────────────────────────┘
```
— 22

FIG. 3A

CLOUD-BASED ITEM STORAGE SYSTEM

CROSS-REFERENCES TO RELATED APPLICATION

This application is a continuation of U.S. patent application Ser. No. 15/187,607, filed on Jun. 20, 2016 by Arash ESMAILZADEH, entitled CLOUD-BASED ITEM STORAGE SYSTEM, which is incorporated herein by reference. U.S. patent application Ser. No. 15/187,607 is a continuation of U.S. patent application Ser. No. 14/048,248, filed on Oct. 8, 2013 by Arash ESMAILZDEH, entitled SECURE DISTRIBUTED DATA STORAGE, now U.S. Pat. No. 9,374,422, issued on Jun. 21, 2016, which is incorporated herein by reference. U.S. patent application Ser. No. 14/048,248 is a Continuation-In-Part (CIP) of U.S. patent application Ser. No. 13/717,953, filed Dec. 18, 2012 by Arash ESMAILZDEH, entitled SOCIAL NETWORKING WITH DEPTH AND SECURITY FACTORS, now U.S. Pat. No. 9,167,038, issued on Oct. 20, 2015, which is incorporated herein by reference.

FIELD OF INVENTION

This invention relates to social networking systems and more particularly to social networking systems that enable, organize and provide diverse types of relationships, as well as greater security and privacy controls. The methods described here allow typical users to communicate and share relative information quickly, efficiently and most importantly securely, while allowing for an enjoyable experience. The invention also provides incentives, checks and balances for all its users, which includes members and sponsors. The invention also provides its clients, such as advertisers, various tools for identifying and targeting customers, e.g., suitable viewers.

BACKGROUND OF THE INVENTION

No single social media company known today provides a platform for its average user to manage different types of relationships each user may have, with specific individuals and with society in general. The present invention is configured to provide various facilities, instrumentalities and methods that existing platforms do not provide to their members/users, and these include:

1. An environment where fluid relationships can evolve and grow deeper over time (referred to hereinafter as "the Depth Factor"). Most of the time when two people meet, they start as acquaintances, which status may stay that way for many years. Alternatively, they may become friends after a few months and progress to becoming best of friends. The relationship may deepen and they may get" married and have children. On a different track, they may become involved in professional relationships such as becoming co-workers, or one becoming an employee of or reporting to the other. In some instances they may decide to undertake a business venture, e.g., together or with people of business, legal or medical backgrounds. One could become a patient or client of the other or one might want to purchase goods or services from the other. They may become vendors, lenders, customers, consultants, insurers, shareholders, directors, executives, staff members, etc., of each other. Businesses take similar paths with their vendors, lenders, customers, consultants, insurers, shareholders, directors, executives, staff members and so forth;

2. An environment that provides a greater sense of security and privacy of certain information, which users need before willing to share sensitive information (hereinafter referred to as "the Security Factor"). Present social media companies store and, therefore, have complete control of their users' private content, i.e., emails, photos, chats, documents, and all confidential data, including financial data, medical data, resumes, user's contact data; clients/contacts contact data, web searches, private content: credit report, DNA, text, photo, audio, video data, social media content, i.e., chats, web searches and shopping. At times, these contents may be too sensitive for any company to store or have access to, regardless of the company's size or its policies. Furthermore, it is possible that a user's content may be accessed without knowledge of the user by the social medial company or by one of its employees which, in general, diminishes or undermines user confidence;

3. An environment where users can cooperate and act as a group by developing a procurement list and so save money when buying goods or services from suppliers. Or, users may utilize the list to get competing bids from suppliers or service/care providers (hereinafter referred to as "the Efficiency Factor");

4. An environment that provides a better experience by using and providing the most up to date, technologically developed facilities (hereinafter referred to as the "Enhanced User Experience Factor");

5. An environment that includes checks and balances, involving disclosing to each other various credential information; as more fully explained below (hereinafter referred to as "the Checks and Balances Factor"); and 6. An environment that better quantifies users' participation and activities and which provides certain incentives, for example:
   a. Users can collect incentives for the time spent online; and
   b. Advertisers can make decisions on how to spend their dollars effectively by profiling and targeting users for different advertisements (hereinafter referred to as "the User Dashboard Factor").

The aforementioned facilities, instrumentalities and methods are also important in the context of people engaging in e-commerce, where there is a constant concern that people's private information, including aspects of various transactions involving purchases of products and communications with commercial institutions may be compromised.

SUMMARY OF THE INVENTION

Accordingly, it is an object of the present invention to provide a social networking system or systems which provide one of or a combination of environments that have: the Depth Factor; the Security Factor; the Efficiency Factor; the Enhanced User Experience Factor; the Checks and Balances Factor; and/or the User Dashboard Factor.

These and other objectives are realized in a system having those various mentioned factors which can be further characterized by the following.

1. The Depth Factor: Generally the present invention comprises an on-line relationship platform and method of interaction, which starts, for example, at the time of initial contact. As used herein, the term "relationship" includes any interaction between people or entities or both, for example: (a) People such as two or more individuals, such as acquaintances, co-workers, peers, alumni, and the like; (b) Entities with people who act as Product/Service/Care providers and customers, employees and employers, and the like; and (c)

Business to Business relationships (b2b), such as Vendor/Service/Care providers and business entities, and the like.

Each type of relationship comprises different levels of depth or intensity. At the time of initial contact, there is an exchange of basic information between two individuals (or entities), as is typical between any two individuals and/or entities. Then, as time passes, the relationship evolves to greater levels. Thereby, more relevant and more confidential information is exchanged or shared.

In an online platform this information is preferably grouped into relationship level categories (referred to herein as "Corners") and maintained in one or more databases. In colleges, trade shows, etc., like minded people or businesses tend to congregate in different "Corners", hence the term "corner". Each Corner is associated with a "Key Phrase". Then, as the relationship deepens, relevant "Key Phrases" for progressing categories may be exchanged to provide for information exchange on a higher, deeper and more intimate or confidential level.

The "Key Phrases" are preferably coined or made up by the platform users, with each "Key Phrase" being associated with a particular category or Corner. Such "Key Phrases" are not limited in nature and may be anything from a pet's name to a mother's maiden name, etc. depending on the sensitivity of the Corner's category. Therefore, unique "Key Phrases" will activate corresponding Corners (or Categories).

2. The Security Factor: Apart from the entry of a proper Key Phrase, another aspect of the system of the present invention involves three requirements and aspects of security provisions for the system of the invention.

Firstly, for user acceptance, the system of the present invention preferably does not own the user's data; does not hold or store the user's data; and does not control the user's data.

Secondly, the actual holder of the user's data and the controller of the user's data is preferably not a single entity, but rather multiple entities. By dividing the data into parts and delegating the storage of data in "parts" to a third party entities, such as to non-profit organizations, the security concern is resolved. Non-profit organizations are not privately owned, and typically controlled by a financially more independent boards of directors. Preferably, a number of each non-profit organization's board of directors, who are involved in the storage and handling of data in the system of this invention, are associated with media and/or press. This should further discourage misuse of data, as doing so would more likely be reported to the public. This method and approach provides a safer, i.e., more secure, platform for today's users.

Thirdly, when the inventive system senses improper attempts to access information, it fills any data vacuum with disinformation. This filling of the vacuum with misinformation is readily provided. Normally, whenever any access to secure data requires a password, the password, in effect, provides an immediate response to the user. If the password is correct, access is granted and, if not, then access is denied. In accordance with an aspect of the present invention however, when a password is entered, regardless of whether it is correct or not, access is granted to the user. A correct password grants access to "Correct Data". In contrast, an incorrect password directs the user to a wrong set of data, referred to herein as "Misinformation Data". Correct Data is entered by the account/data owner. The Misinformation Data is generated by a set of servers of the system, which have been programmed with algorithms to automatically fill the vacuum with the Misinformation Data.

3. The Efficiency Factor: As one example, consumers can simply compile a list of basic items on a shopping list. In one example, items that have already been consumed are scanned onto on-board chip of a storage door, i.e., "Smart Fridge" and/or as being disposed into "Smart Trash Bin" and or standalone plug-in I hardwire unit. Then the list is uploaded via WiFi or LAN to the Cloud, and then the list is processed to find the lowest local and online prices, coupons, closest market, search coupons, items on sale, closes shop, forecast, recommend complementary items, recommend ways of acquiring quickest route or cheapest route, greenest route, local producers, healthiest, supplier ratings or hybrid, etc. The list can be downloaded onto a smart phone or onto a smart shopping cart, which may be programmed to find the shortest route to the relevant market or within a market. The Smart Fridge or Smart Trash Bin are basic appliances equipped with Laser Scanners built in (or retrofitted into) the appliance doors. The scanner is similar to market scanners. To accomplish the foregoing, the consumer scans items as empty containers of food are being disposed at the Fridge or the Trash Bin, before disposal. As RFID technology is being implemented, similar scanning could be implemented using RFID, cameras, standalone or located within a phone. The system can also monitor the consumer's usage based on frequency of items being purchased and so evolve a simple forecast of needed items. Then the forecast generates a recommendation list for the consumer at the time of shopping. At the time of shopping, the system also may suggest items that are not on the list, that complement the items that are on the list, or it can suggest items that are currently "on sale" (i.e., offered at a lowest price within a 20 mile radius). As an option, the Fridge console also can be utilized for checking off items from the list, as newly purchased items are being placed into the Storage.

4. The Enhanced User Experience Factor: To enhance user experiences, the user interface provides users the option of listening to chats, email or any data in text format. The audio is synthesized by software which mimics the voice of the individual who has sent the message. For the software to achieve this, first the user sending the message goes through some steps to familiarize the software with the user's voice tone and accent. Second, the software analyzes the user's vocals against standard off the shelf speech software. It would use the off the shelf software as a base line and make adjustments specific to the user's voice according to the database accumulated for the user.

5. The Checks and Balances Factor: If a "User A" wants to see "User B" info, not only must User A have the correct "Key Phrase(s)" but also must have identical or better "Credentials," verified at the time of access.

6. The User Dashboard Factor: A user console is provided to track usage and activity based on the following and other criteria:

a. Invitations: A Database is created for each user, as the user sends invitations to new or other users (invitees) and then accepted. The list grows as new invitees accept. The total number of invitees is then linked to a type of incentive.

b. Viewed Ads: Another Database is created for each user to track each user's activity which can be measured as time spent viewing ads. The total number of ads seen is then linked to a type of incentive.

c. Advertiser and user needs. The advertiser/client can select, from the user's console, which demographic it wants to target. After publication, the advertisers can view, from their account, how many ads were inserted, hovered over, and links clicked by the users, in a summary format or a drill down to activity by data range. A general demographic data of the users is also supplied to the advertiser to determine whether it likes to keep its ad campaign as is, or make improvements by either changing the ad itself or its targeted audience. Within the ad, the users are asked whether they are interested in being contacted by the advertiser. If yes, then the user's contact info is also provided to the advertiser's console or "dashboard".

d. As users input personal content, the content has relevant information which is useful to the advertisers. Such information as gender, race, age, current location, addresses, medical data, financial data, employment data, scope of work, shopping list, service/care list and etc. The information gathered on the users can be utilized by the advertisers to place their ads in front of select audience, without revealing the identity of the viewer to the advertiser, unless permission is granted. The ad contents is merged with the user content (from independent servers) and fed the viewer. The viewer, viewing the contents of the users could be looking at correct data or incorrect data depending which key phrase has been entered, regardless of which, the ad content is correct content. At no time is the user content or the viewer content stored on our servers. The Advertising Server does store ad content, ad count (#of views by what type of viewer: gender, age, location, etc., i.e., 50 men, 60 women, 10 in NY, 50 LA, 8 ages 20-30, 100 ages 30-40, etc.).

Accordingly, and as previously noted, the aforementioned objectives, including the various so-called factors are applicable in accordance with the description of the present invention to e-commerce transactions, as more fully described below.

The above features of the invention will be more readily apparent from the description of the preferred embodiments thereof taken in conjunction with the accompanying drawings and appended claims.

BRIEF DESCRIPTION OF THE DRAWINGS

FIGS. 3A and 3B are a flow chart of web pages progressing through log-on to the system, to entry of "Key Phrases" to access Corners or categories of personal relationship and opening of a contact console page;

DETAILED DESCRIPTION OF THE INVENTION

Generally the present invention comprises an online interactive communication, contents sharing and chatting (including emails) system configured for providing information to a web site having different levels of user interactions. The provided information is available to or shareable with registered users of the system at specific, user defined or chosen levels thereof The provided information is keyed to different levels of interaction with different Key Phrases being linked to the different levels, the correct entry of which provides access to the linked levels of communication and information available therein by registered users. In a preferred embodiment, the system is configured such that incorrect entry of a Key Phrase provides a pseudo entry into a level with Misinformation Data generated by the system.

The method of the present invention comprises the steps of:
a) setting up an online communication system configured for the storage or sharing of entered information;
b) configuring the system with multiple levels of interactive relationships with concomitant information being entered into respective levels according to the nature of the level; and
c) setting the access to information in the respective levels and interactive communication therewithin, based on the correct entry of preset Key Phrases respectively linked to different levels.

Figure 6:
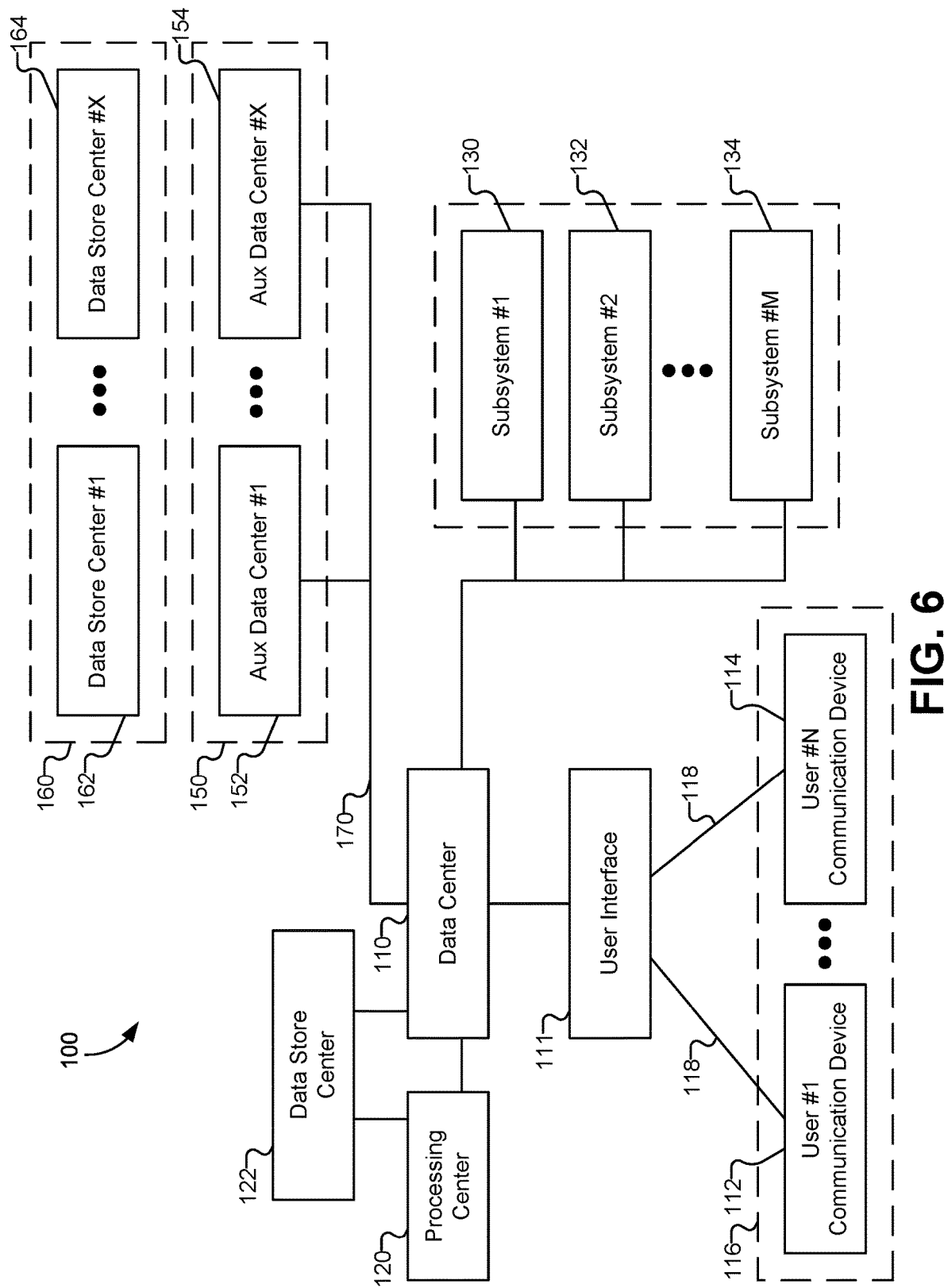
FIG. 6 is a system block diagram showing certain aspects of the system of the present invention.

Referring to FIG. 6, as with typical online interactive communication systems, the present system 100 can comprise a generic data center 110 which typically includes a processing center 120 and a user interface 111. These hardware/software components can be located, as well known, at a single location or distributed geographically throughout the United States, or even the world. Inherent in such prior systems is a data storage facility 122, which, again, can be physically located at a single location or distributed throughout the world.

Users 116, who can number in the millions, utilize personal communication devices 112 . . . 114 to communicate via the Internet 118, or through non-Internet communication systems, such a cable systems, telephone systems, direct wireless systems, with the data center 110 through the user interface Ill, all in well known fashion. Users can register with the data center 100, and upon being qualified, become participants in the online interactive sessions that the data center provides, which allows for the interchanges of various personal and non-personal content, live chatting or written communications the playing of audio and video content and the like.

As with all data centers, internal software controls various subsystems 130, including in the example shown, first subsystem 132 and an Nth subsystem 134. These subsystems 130 can have various software modules in well known fashion, which can control various functions, including, respectively, registering new users, billing and accounting functions, handling security, providing search facilities, policing permissible content only to be listed, overseeing compliance with regulatory requirements, and many similar functions which are well known in the art, including such well known functions encountered in the existing social networks such as Facebook, Twitter, Linked-In, and similar commercial networks that provide vending systems such as Amazon, Google, Ebay and many others.

A novel aspect of the present invention comprises the use of auxiliary, independent data centers 150 comprising a plurality of independent data centers, including first data center 152 and an Nth data center 154, each operating independently and each having its own respective data storage center 160, which includes a first data storage center 162 and an Nth data center 164.

In the description below, reference is made to five such auxiliary, independent data centers 150. A key consideration of these auxiliary data centers 150 is that they communicate with the primary data center 110 over a communication line 170, and serve to store user content which has been dissected in such fashion that no single entity can actually have access to analyze and obtain for itself the contents of individual users 116. This is because the data of the user is subdivided and stored in different and totally independent data storage servers, which are accessible only by their respective data centers.

The data center 100 described herein contains the software driven subsystem modules that allow and effectuate the following, as well as so-called factors.

1. The Depth Factor: The following Example is an illustrative scenario of a relationship development and communication, as embodied in the system of the present invention, after both participants have registered with the system.

As an example, Jack and Jane have just met and decide to keep in touch as friends, so they exchange email addresses and Key Phrases, "Wags" and "Scooter", the names of their respective pets. In order to communicate, as shown in FIG. 3A (having already gone through the registration and information entry phase of FIGS. 1 and 2). They do so by entering the other's email address to find the other's information and chat page, as indicated by the web screen pages 20-22. They then respectively enter the preselected "Key phrase" on each other's Contact Console Page, to reveal the most basic information of their counterpart, e.g., cell phone number, work number, emails, and a few photos. As time passes, Jack and Jane decide to engage in a lender and borrower relationship. At this point, the borrower furnishes the borrower's mother's maiden name (for example) as a Key Phrase to the lender, which permits the lender to access typical information relevant to a loan, and the transaction is more readily effected.

Figure 3B:
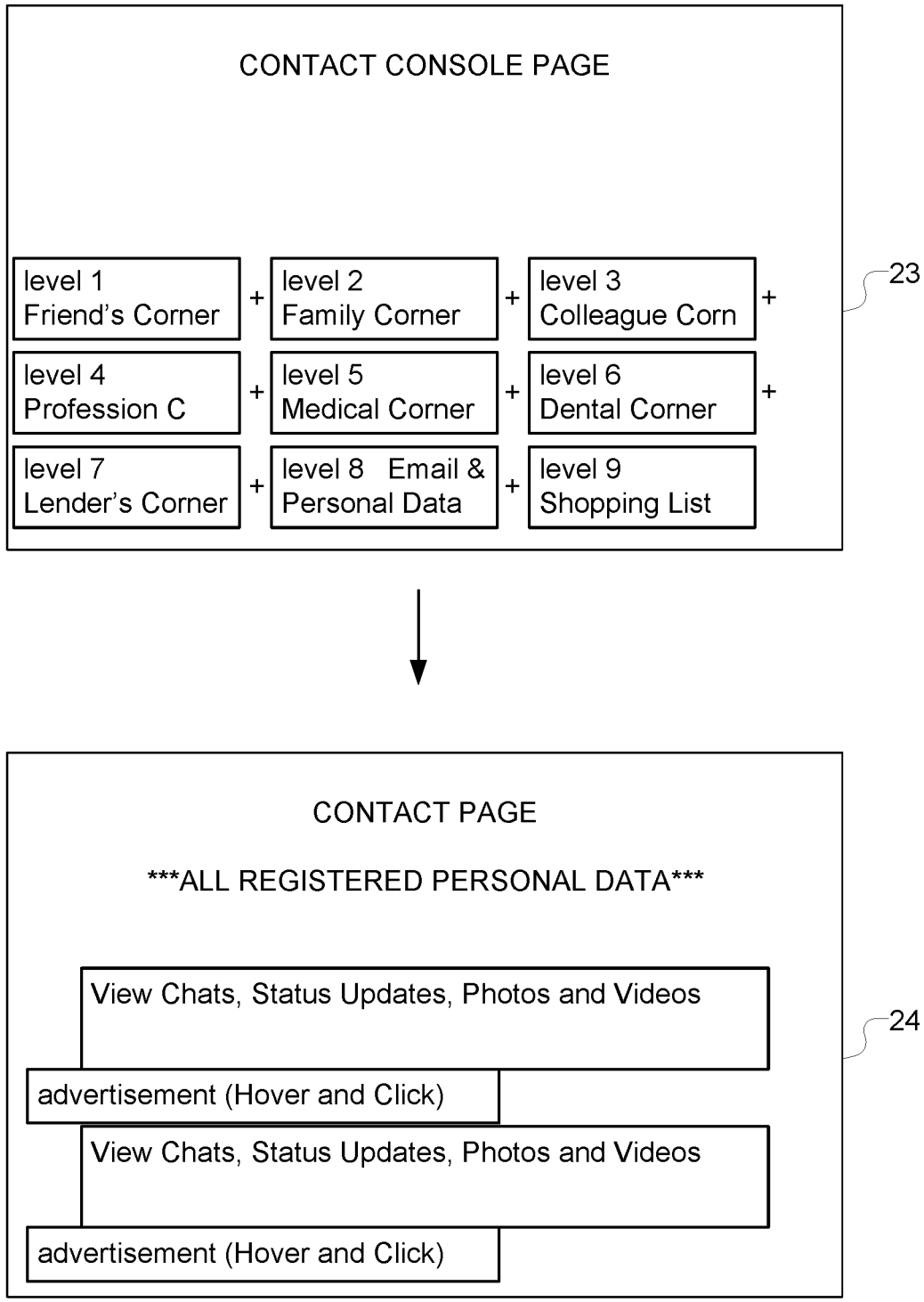

FIG. 3B shows a Contact Console Web Screen 23. The screen 23 shows typical levels, and as used with the system of the present invention, the levels are associated with Key Phrases for categories or Corners and typical levels of communication. The contact page or screen 24 lists activates available on the system of the invention. The levels 1-7 include different content, reachable at level 0, 1, and so on, as follows:

Level 0 (Acquaintance): By providing just an email address, only a photo of the user is available to be revealed.

Level 1 (Friends): Providing the correct Key Phrase for the Level 1 (friends) allows the user to gain access to the detail information as in Level 0, plus more information, such as full name, addresses, phone numbers and limited distribution (or personal) photos and videos. Collective chatting can be conducted among the Level 1 friends, both privately and securely.

Level 2 (Family): In this level, by providing the correct "Key Phrase", family members have access to private family information such as matters relating to the family members or significant others and which may be very personal and confidential. Entering this level can be used to restrict a "chat" forum to only family members.

Level 3 (Colleagues): Entry of a "Key Phrase" at this level reveals information of Level 0, plus, full names, addresses, phone numbers and limited distribution type photos and videos and is similar to Level 1 for friends, with secure chatting among "colleagues".

Level 4 (Profession): A job seeker, by providing the correct "Key Phrase" is able to provide targeted information related to work experience, resume and references to a potential employer and they can chat privately and securely, on a one to one basis.

Level 5 (Medical): This level provides for private doctor-patient communication by which entry of the correct "Key Phrase" makes available to a physician's office the typical registration information asked for during a first physician visit. Patient's information can be privately and securely directly downloaded to a physician's MIS, thereby saving time for both patient and receptionist/record keeper. Discussion of sensitive medical matters can also be effected, both privately and securely. Furthermore, a Patient's Form can be pre-printed with Patient's information, including allergies, previous procedures, emergency contact and etc. All patients forms which need to signed, can be signed in an instant at the doctor's office.

Level 6 (Dental or any other product/service/care providers): This is similar to the Level 5 medical corner, with this level providing relevant information to a dentist's office or any other product/service/care provider by entering the correct "Key Phrase".

Level 7 (Lender): Entry of the correct "Key Phrase" provides relevant information on-line to a lender or a lender's agent, in an effort to save time and paper with the ability to conduct private and secure conversations or chatting that is limited to the lending/borrowing transaction.

Level 8 (Personal Vault): This is used primarily as an Information Vault. Personal and sensitive information can be stored securely, with peace of mind, including emails, documents, photos, web searches and sites visited, receipts, task lists, itineraries, locker combinations, credit card numbers, social security numbers, calendars, address books, contacts, medical records, transcripts, notes, diary entries, songs, videos, play lists, resume details, etc. The information vault is available for private or designated shared use on the web on a 24/7 basis and anywhere online access is available.

Level 9 (Work/Shopping List): Entering a correct "Key Phrase" reveals relevant information to, for example, a contractor if one is doing a remodeling job. A shopping list can be provided to a housekeeper, or any individual who does the household shopping.

2. The Security Factor: Turning to security, a primary reason behind users lack of confidence in the social media services is that the providers of those services exercise and retain full control over users' private data, which data is kept on systems of and/or owned by the social media companies.

To avoid this lack of confidence and unease, the system of the present invention preferably acts purely as a data processing center, with no data storage operability.

Figure 1:
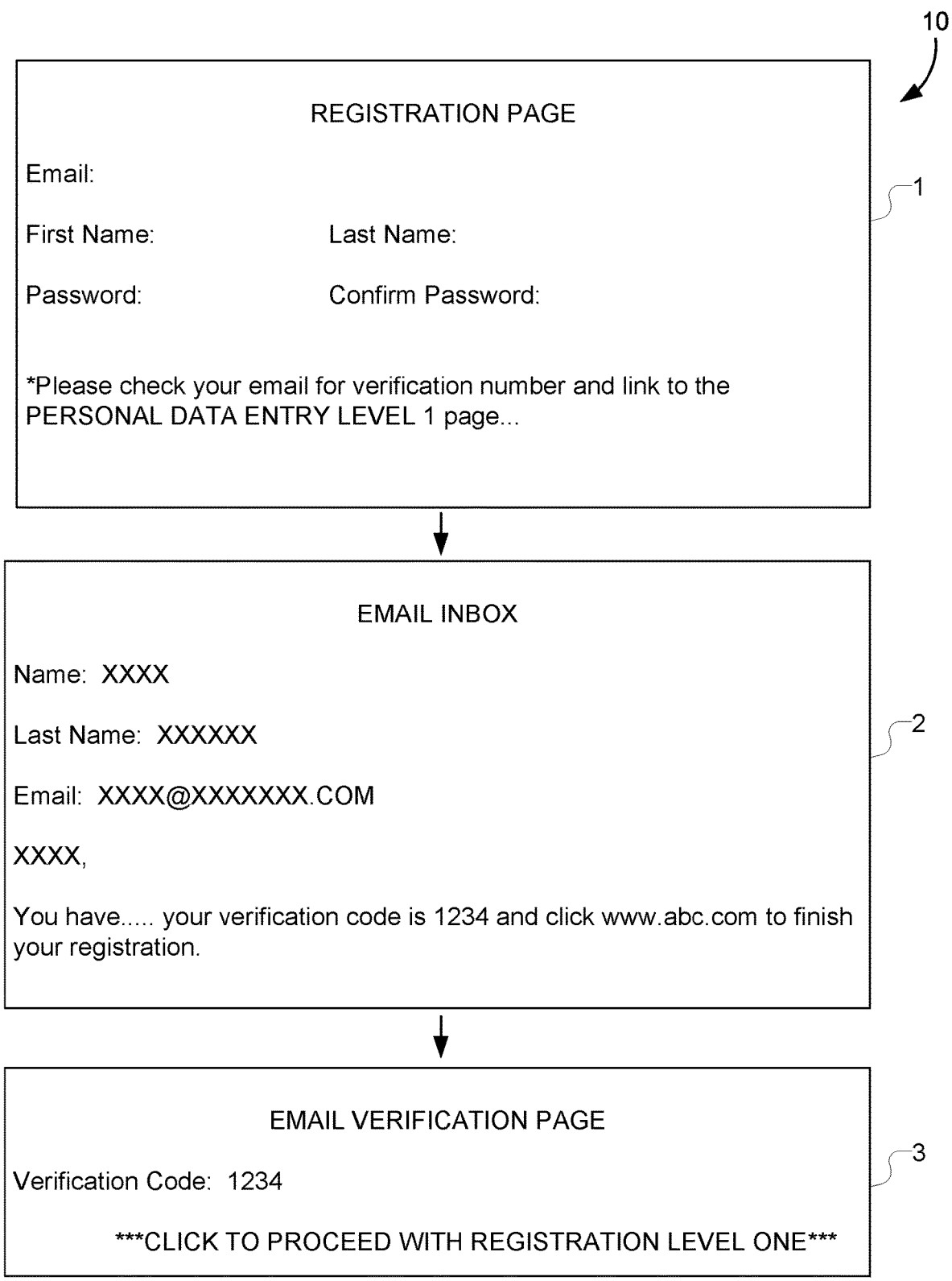
FIG. 1 is a flow chart showing initial registration to the system of the present invention.

The present system exemplified by reference to the drawings shows in the flow chart of FIG. 1, an initial registration page or screen 1 common to online systems, wherein a prospective user of the system enters basic name, e-mail and password information. Entry of the information provides the user with an email in box 2 and verification of the registration screen 3.

Figure 2:
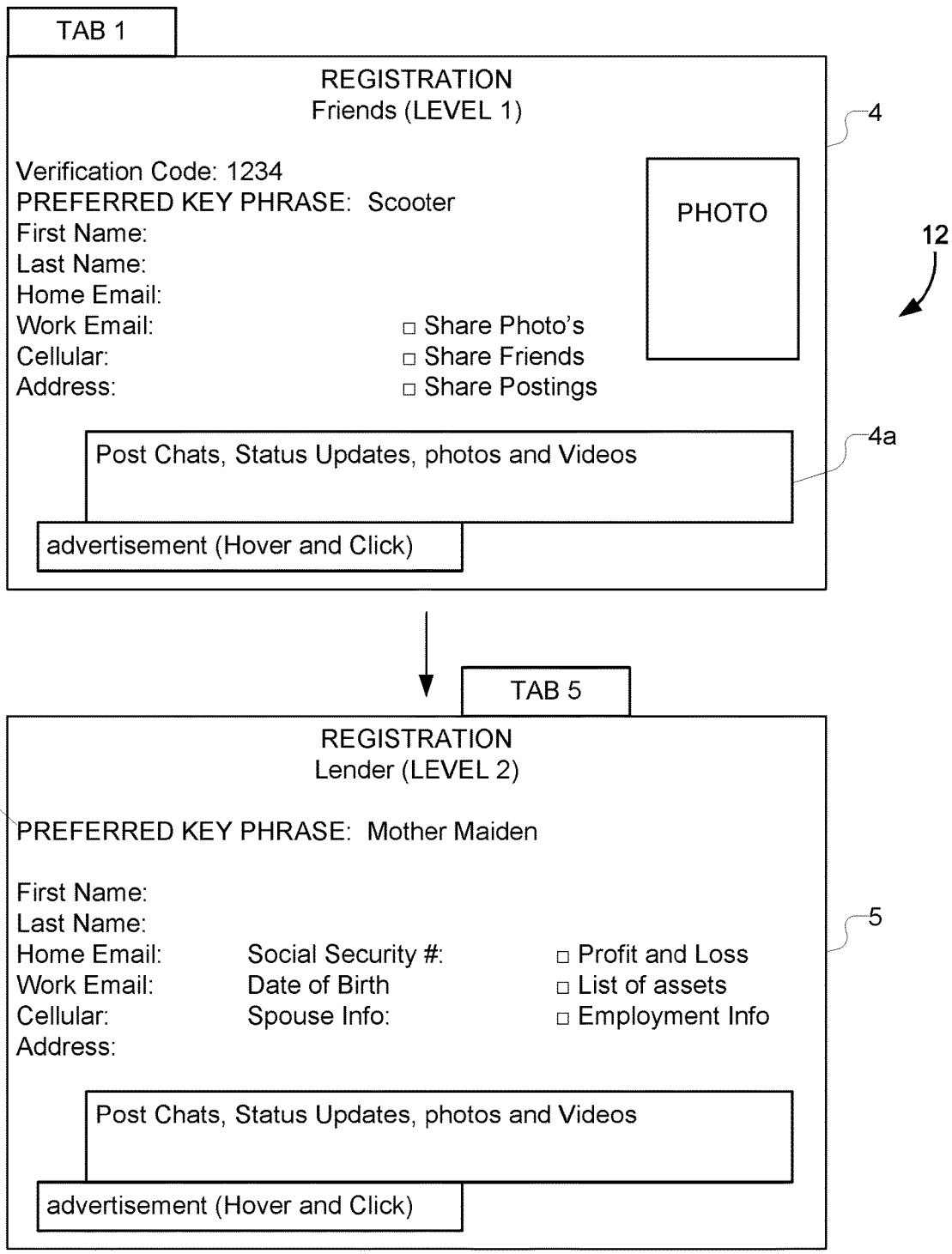
FIG. 2 is a continuation of the flow chart of FIG. 1 showing registration entry processes with information entry into a typical Level 1 relationship and a Level 2 relationship, with a friend and a personal business lending relationship respectively.

Referring to FIG. 2, a Registration Level 1 (TAB 1) window 4 for Friends is shown being opened for entry of information to be provided at this level, including: A photo, Key Phrase for access to the information, Full name, Cellular phone number, Physical address, email addresses (work and home) and Authorization action check boxes for sharing items.

A separate chat, status, and general posting box 4*a* is also provided.

The successive screens 10 at FIG. 1 include the registration page 1, email inbox setup box 2 and email verification page 3. In FIG. 2, Tabs 1 and 5 are respectively opened by addressing and filling of screens 12, including page 4 for a Friends Level 1 (involving entry of friend related information). The TAB 5 page, which is screen 5, is opened for lender transaction information, with entry line at 13 for the Key Phrase for this level in addition to the information for the first level in the screens 1-3 of FIG. 1. Business information such as social security number, date of birth, spouse information is enterable, as indicated with check boxes for authorization of information regarding profit and loss, asset listing and employment as relevant information for a loan transaction. Other Tabs are provided for different corners or levels, as previously described.

After registration, with completion of information entry in screens 4 and 5 and any other level pages desired, opening of the system account and entry of relevant information for each of the levels selected, and access to screens 20 to the information, by registered participants for the particular levels, is shown in FIG. 3A. A sign-in welcome page or screen 21 calls for a commonly used entry of email address and password to arrive at a home page 22 and with an option to search for a particular person. The contact console page 23 (at FIG. 3B) provides various level corners or categories, with entry into selected contact pages 24 being enabled with the entry of the appropriate Key Phrase, for information sharing and chatting.

Figure 4A:
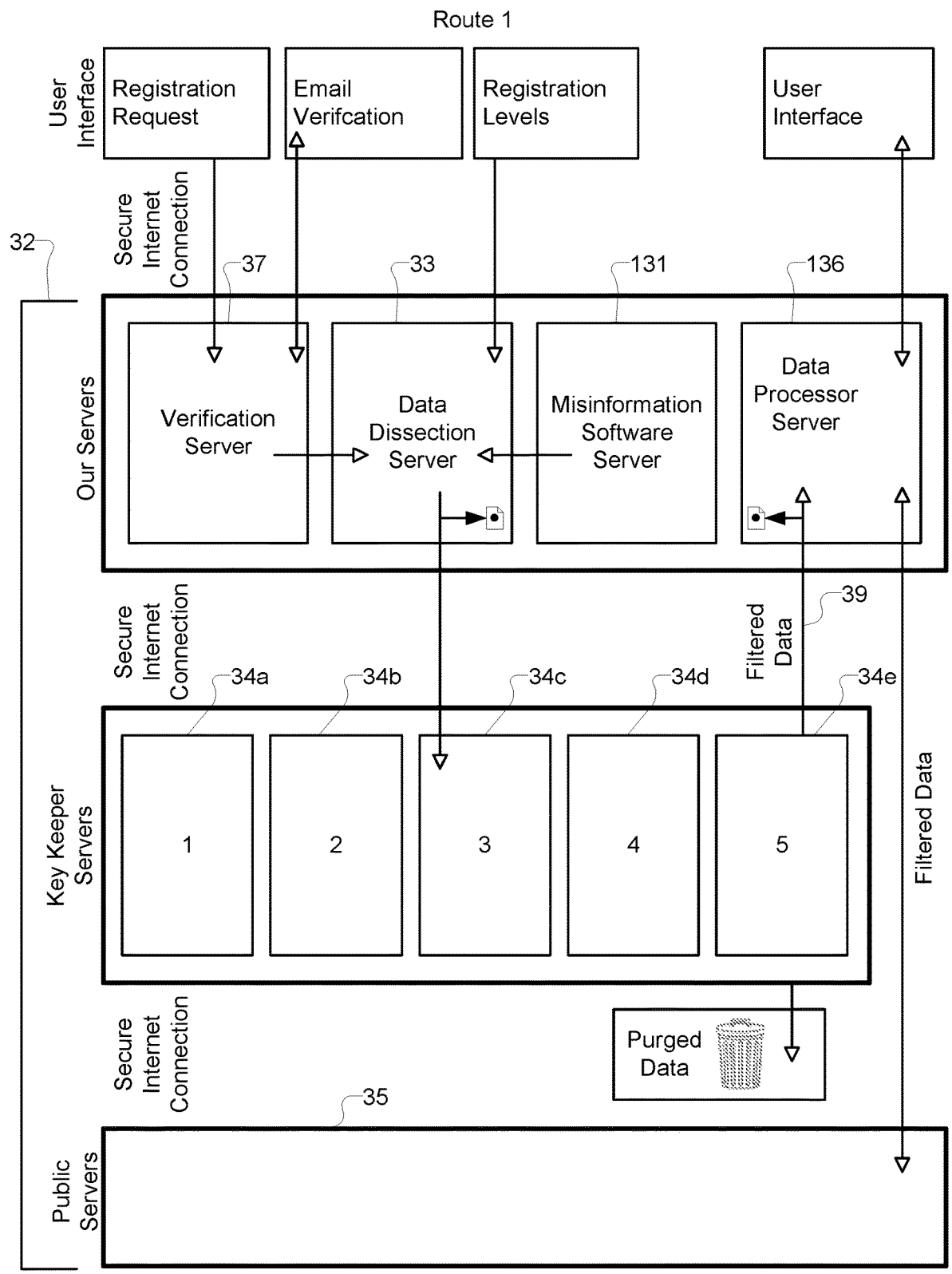
FIGS. 4A and 4B are flow charts, which depict respective operational security scenarios and routes, including providing misinformation in certain situations.
Figure 4B:
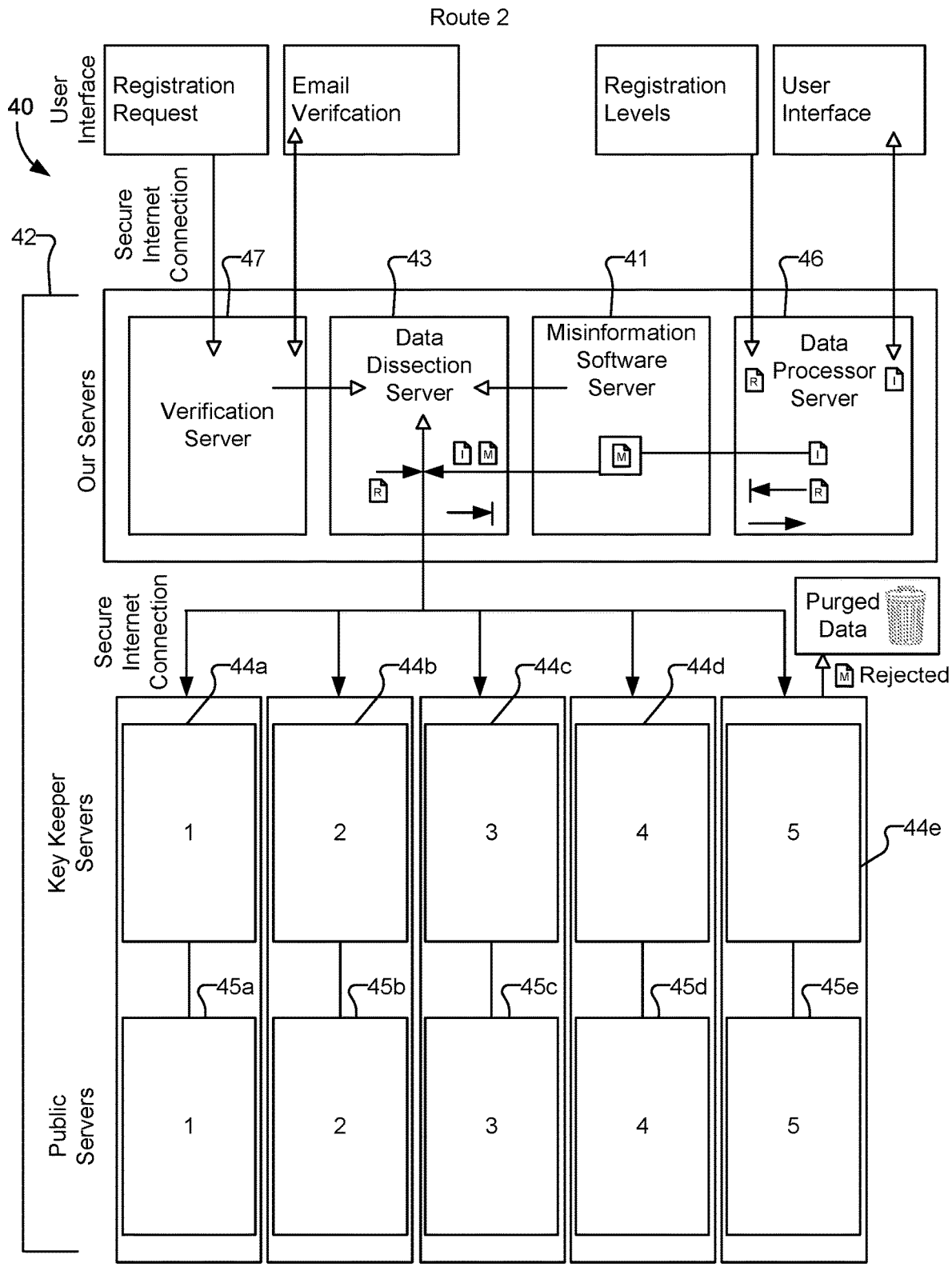

FIGS. 4A and 4B depict operational Routes 1 and 2 for contact data handling, via flow charts 30 and 40 respectively. These flow charts concern interactions between the system users and system servers over interne connections. These flow charts map the process features of security misinformation software containing servers 31 (FIG. 4A) and 41 (FIG. 4B).

In the Route 1 process of FIG. 4A, as the initial encrypted Email Verification page is submitted to the system servers, the email and password contents are dissected into several parts by data dissection server 33 (FIG. 4A) or 43 (FIG. 4B), equal to the total number of Non-Profit Entities (aka "Key Keeper" Servers 34*a-e* and 44*a-e*). FIGS. 4A and 4B assume and show five such servers, but use of more or fewer servers is, of course possible. Each dissected data part is transmitted to one of the five Key Keeper Servers (34*a-e*, 44*a-e*) and then, each of the five servers responds with a confirmation that the registration is complete.

Next, the new user starts entering "Key Phrases" for each level along with the corresponding contents. Note that just the "Key Phrase" by itself is also subjected to being dissected into five parts, which dissected parts are then transmitted to respective ones of the five Key Keepers with the user waiting to receive recorded confirmations. The "Key Phrases" along with rest of the content are merged and sent to "Public Server" 35 (FIG. 4A) and to servers 45*a-e* (FIG. 4B). These "Public Servers" (35, 45*a-e*) are separate servers, different from the servers of the five Key Keepers (34*a-e*, 44*a-e*), and they have an independent Non-Profit entity presiding over and controlling them. However the function of the Public Server is very different from that of the other servers. The storage capacity of the Public Server is much greater since it stores all the contents of what is known to be true data, generated from the users, as well as all the false data generated by the Misinformation Software (31, 41).

Recording and accurately storing the email addresses along with their passwords and their Key Phrases contents on the Key Keeper servers (34*a-e*, 44*a-e*) is highly preferred. This is because, as data from the Misinformation Software is being generated and streamed in, the Key Keepers function and serve to filter out the recorded Key Phrases, so that false changes are not made to the user's account, as indicated by data flow arrow 39.

After the filtration process is completed, the filtered data is sent back to the processing servers and merged with User's Data and sent to the public servers.

The operation, as indicated by Route 1, requires large capacity servers, which are not practical even today (on the order of 10,000 TB/user). Accordingly, the operation shown via Route 2 (FIG. 4B) addresses this issue by generating the misinformation data at the time of inquiry. With the operation according to Route 2, after email verification, and completion of the registration by the account holder, for every inquiry generated from the user, misinformation data is generated for the same Key Phrase and sent to the Key Keepers. If the Key Phrase is correct, as given from the user, then the Key Keepers reject the misinformation data (which is purged) and correct information is recalled and fed back to the user. However, if the Key Phrase is incorrect, then misinformation data is recorded and stored in the Public Server (45*a-e*) and is also fed to the user. Feedback to the account holder advises the account holder that a user has tried to improperly obtain information and has failed. As a further safeguard it is highly preferred that all communications, between all the servers and the users are highly encrypted under both Route operations.

An example of misinformation being fed to a user who has entered incorrect data is shown below:
Command: Randomly initiated to Update chat for the account lmn@xyz.com with the abc@efg.com user in the Colleague's corner, as follows:
March 12, 10:24 abc@efg.com: "Happy Birthday!!!"
March 12, 11:25 lmn@xyz.com: "Thank you"
March 12, 14:05 abc@efg.com: "Any big plans?"
March 12, 16:20 lmn@xyz.com: "Dinner with family."

It is noted that an authorized user would recognize the incorrect nature of data obtained with a mis-keyed password, whereby a correct one will be subsequently entered.

The data dissection servers 33 and 43, referred to above, contain software designed to dissect data as follows, assuming, for example, there are 5 Key Keeper Servers and 9 levels. Each server records and stores the data (known as the Registration Process) as illustrated below.

| Key Keeper Servers: | 1 | 2 | 3 | 4 | 5 |
|---|---|---|---|---|---|
| Email: abc@def.com | aeo | bem | cf | @ | de |
| Password: glaceau118 | ga | lu | al | cl | e8 |
| Key Phrase 1: Scooter | se | cr | o | o | t |
| Key Phrase 2: Tammy | t | a | m | m | y |
| Key Phrase 3: adam | a | d | a | m | |
| Key Phrase 4: Mr. Lee | me | re | . | | |
| Key Phrase 5: Dr. Gold | do | rl | .d | | g |
| Key Phrase 6: Dr. Stein | dt | re | .l | n | s |
| Key Phrase 7: Seth | s | e | t | h | |
| Key Phrase 8: Vegas | v | e | g | a | s |
| Key Phrase 9: Shop | s | h | o | p | |

Note: Key Keeper 1 may or may not necessarily record the 1st, 6th, 11$^{th}$, etc., character. The dissection pattern could be randomized.

The Key Keeper Servers analyze the stream data (Key Phrases only, with the rest of the contents being passed to the Processor Server 36 (FIG. 4A) or 46 (FIG. 4B)), and idle until the result from the Key Keepers is returned under Route 1 from the user, or misinformation software, under Route 1, with tag Status. Results then follow as Valid or Invalid, depending on the Response, with the following exemplary scenarios:

Scenario 1:

| Key Keeper Servers: | 1 | 2 | 3 | 4 | 5 | Response | Status |
|---|---|---|---|---|---|---|---|
| Email: abc@def.com | aeo | bem | cf | @. | de | 00000 | Valid |
| Password: glaceau118 | ga | lu | al | cl | e8 | 00000 | Valid Key |
| Phrase 3 adam | a | d | a | m | | 00000 | Valid |

Result: If all 15 fields are valid, then = valid

Scenario 2:

| Key Keeper Servers: | 1 | 2 | 3 | 4 | 5 | Response | Status |
|---|---|---|---|---|---|---|---|
| Email: abc@def.com | aeo | bem | cf | @. | de | 00000 | Valid |
| Password: glaeau118 | ga | lu | al | ck | e8 | 00000 | Valid Key |
| Phrase 3: alec | | a | l | e | c | 0181181 | Invalid. |

Result: If one or more of the 15 are invalid, then = Invalid

In accordance with Route 1, data is then sent to the "Processor Server" (36), based on results. If the results are "Valid", then the record is purged of all its contents. If the results are "Invalid" then the information is merged with users info and sent to the "Public Servers" (35) and stored.

In accordance with Route 2, if the results are "Valid", then the misinformation data is rejected from the Public Servers (45a-e) and then purged. Stored correct data (from the registered account holder) is retrieved from the Public Server and fed to the user. If the results are "Invalid", then the misinformation data is accepted, and stored on the Public Server and fed to the user.

The Verification Server 37 (FIG. 4A) or 47 (FIG. 4B) plays a role in security as well with respect to credential verification such as with steps taken to verify email address and for example the following:

Cell Phone: Text with a verification number.

Land Line: Call made to the user with a verification number.

Fax Line: Send fax with a verification number.

Address: Mailing a postcard to the user with a verification number.

Bank Account: By transferring a few cents to the user account and asking for the amount for verification.

Credit Cards: Making a charge for a few cents to the users account and asking for the amount for verification.

Businesses Credentials: Doctor, dentists, lenders, etc., are manually verified. The verification process is applied to security, such as if a User "A" wants to see User "B" info, not only must user "A" have the correct "Key Phrase" but also must have identical or better verified "Credentials" at the time of access.

3. The Efficiency Factor: To facilitate shopping for the household items, the list can be compiled by utilizing a scanner affixed on kitchen or restaurant appliances or office supply storage doors. Empty consumed containers are scanned before disposal. Details and configured results of the scanning are then directed to be downloaded, as appropriate lists, in an appropriate level.

Figure 5:
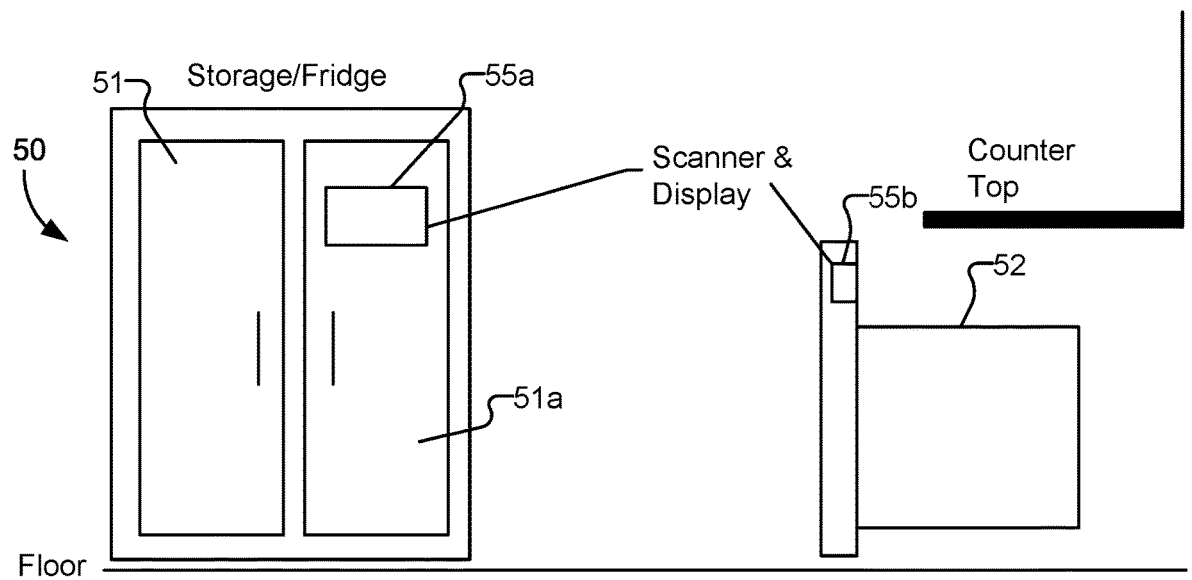
FIG. 5 is a scanner embodiment for providing shareable information for a personal vault in another level corner.
Figure 5:
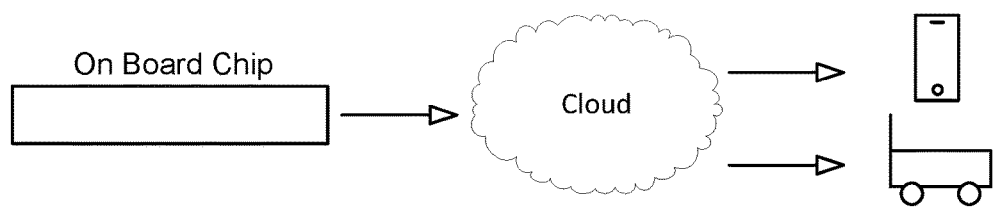

FIG. 5 depicts an embodiment which utilizes accessed corners or levels as a personal vault for storage of information for sharing or personal use (as described with Levels 8 and 9, above). Consumers can compile a list of basic items, or create a shopping list where items that are already consumed are scanned onto an on-board chip 55a (FIG. 5) of an appliance storage door 51a of a system 50, including a refrigerator 51. The list is transferred to the vault level, i.e., "SmartFridge" and/or entered into a "Smart Trash Bin" 52. The list is uploaded via WiFi or LAN to the Cloud 53. The list can also be processed for lowest local and online prices, available coupons, closest market, etc. The list may be downloaded onto a smart phone 60, or smart shopping cart 70 (in order to navigate the shortest route to the market). The Smart Fridge or Smart Trash Bin are basic appliances equipped with Laser Scanners 55a and 55b (built in (or retrofitted with the laser scanners) to their doors with the scanner being similar to available scanners. The consumer scans items as empty containers of food are being disposed at the Smart Fridge or disposed at the Trash Bin, before disposal. As RFID technology is being implemented and improved, scanning can be realized with RFID technology and communication. As a less costly method, a camera could be utilized, instead of scanner, for a similar scanning function. Consumer's usage may also be monitored, based on frequency of items being scanned and entered as being purchased to provide a simple forecast.

A forecast then generates a recommendation list for the consumer at the time of shopping. It also may be programmed to suggest items that are not on the list but which may complement items that are on the list, or suggest items that are on sale (i.e., with indications of lowest price items within a 20 mile radius). As an option, the Smart Fridge console also can be utilized for checking off items from the list, as newly purchased items are being placed into Storage. Suggested items may include one or more of: search coupons, items on sale, closes shop, forecast, recommend complementary items, recommend ways of acquiring: quickest route, cheapest route, greenest route, local producers, healthiest, supplier ratings, or hybrid.

Also, in accordance with a similar embodiment, a database can be utilized for accumulating or generating lists such as the scope of work for suppliers, contractors or service/care providers for a bidding process.

4. The Enhanced User Experience Factor: In another embodiment of the invention, a speaking user interface is used to enhance the user experience. The user interface provides users with the option of listening to chats, email or any data in text format. The audio is synthesized using software which mimics the voice of the individual who has sent the message. For the software to achieve this, first the user sending the message must prepare the system to familiarize the software with user's voice tone and accent. Secondly, the software is configured to analyze the user's vocals against standard off the shelf speech software using the off the shelf software as a base line and making correction adjustments to the voice, according to the database accumulated from user input.

5. The Check and Balance Factor: If a "user A" want to see "User B" info, not only must he or she have the correct "Key Phrase" but also must have identical or better "Credentials" verified, at the time of access.

6. The Dashboard Factor: In yet another embodiment of the invention, the user's activity and tracing function can embody functions as follows:

a. In one embodiment, a database is created for each user as the invitations are sent out to new users (invitees) and invitations are accepted by completing the registration. The list grows as new invitees accept, with the invitations having links to the Registration Page, via an inviter's page site. Depending on number of invitees, each user could receive different amount of incentive.
b. Also, in an embodiment, a database is created for each user for a total number of ads viewed, hovered over, or clicked a link to access an advertiser's site. Each could provide users different type or amount of incentive.
c. A further enhancement of the system of the present invention comprises "Viewer Advertisement Exposure" wherein there is a counting and totaling, related to a Holder's account, of how many ads the account holder has viewed, hovered over, or clicked a link to access an advertiser's site.
d. As part of this Dashboard Factor, when a user logs into an account, and starts viewing the contents, the user interface begins adding the number of ads viewed, hovered over and links clicked on, during the time the account holder was logged on. This information is directly stored on the account holder's database with the account holder being able to view the totals on each item, at a "Personal Corner" in a summery format. The summary can be drilled down, so the account holder can view them in different formats such as on a daily, weekly, monthly or annual basis.
e. An advertiser can select, from the user's dashboard, which demographic it wants to target. After publication, the advertisers can view, from their account, how many ads were inserted or opened, hovered over, and links clicked by the users, in a summary format or drill down to activity by data range. A general demographic data of the user is also supplied to the advertiser to determine whether the advertiser wants to keep its campaign as is, or to make improvements by either changing the ad itself or its targeted audience. Within the ad, the users are asked whether if they are interested to be contacted by the advertiser? If yes, then the user's contact info is also provided to an advertiser's dashboard.
f. As users input personal content, the content has relevant information which is useful to the advertisers. Such information as gender, race, age, current location, addresses, medical data, financial data, employment data, scope of work, shopping list, service/care list and etc. The information gathered on the users can be utilized by the advertisers to place their ads in front of select audience, without revealing the identity of the viewer to the advertiser, unless permission is granted. The ad contents is merged with the user content (from independent servers) and fed the viewer. The viewer, viewing the contents of the users could be looking at correct data or incorrect data depending which key phrase has been entered, regardless of which, the ad content is correct content. At no time is the user content or the viewer content stored on our servers. The Advertising Server does store ad content, ad count (#of views by what type of viewer: gender, age, location, etc., i.e., 50 men, 60 women, 10 in NY, 50 LA, 8 ages 20-30, 100 ages 30-40, etc.).

The foregoing description focuses on the application of the various systems and subsystems of the invention to software as a service (SAAS), as well as to the social media environment and to websites such as Facebook®, Twitter®, and the like. One of the important aspects of the foregoing description resides in the "forgetfulness" feature that is part of the Security Factor which dissects and subdivides every piece of confidential or private information and stores it in disparate data centers which are preferably controlled by disinterested independent parties. This makes it exceedingly difficult to penetrate, retrieve and then recombine sensitive information, given that it is necessary to access multiple, independent systems to do so. However, the utilization of the forgetfulness feature is not necessarily limited to SAAS and to the social web media scene.

As stated above, people's personal information and very sensitive, private data is constantly revealed, accumulated, and stored by third party commercial vendors during the course of people conducting various business transactions and communications with their financial institutions. The third parties often "mine" this private information and use it for their own private commercial interests, and sometimes even for sale to third parties, which is extremely disturbing to many individuals.

Therefore, the further aspect of the invention relates to additional developments of the concepts of dissecting and subdividing sensitive information into multiple portions and storing the dissected data at relatively difficult to access, multiple locations, to make it more difficult to reach.

Preliminarily, reference is made to previously described FIGS. 4A and 4B, which describe the storage of the sensitive information in so-called keeper servers 1-5 shown in FIG. 4A, or through similar servers identified by reference numerals 44a-44e relative to FIG. 4B. In accordance with the one aspect of this additional description, it is intended that in addition to the previously listed private content, a user's "private records" can also be added to such private content.

In addition to such private records, online "transactions" must also be added to the list. Types of online transactions to be so handled can arise in the following contexts. As a first example, when a consumer purchases goods online, the merchant servers, financial institutions and the shipping companies are all storing valuable information of the consumer which later can be used for unintended and undisclosed purposes. Businesses also have similar concerns with the privacy of the information when they are transacting online business with other businesses or with their SAAS providers, including CRM (Customer Relations Management), MIS (Management Information Systems), ERP (Enterprise Resource Planning), and like vendors.

The concern with the privacy of highly confidential business information also arises when dealing with TV subscriber information, as well as with telecommunication users, travelers, interpersonal relationship seekers, and people known as "garners".

Accordingly, the invention achieves a solution to the foregoing drawbacks of the prior art by storing private data within designated personal storage space, including transactional details, and by first utilizing unique data decentralization system heretofore described. Secondly, no private content is stored by the actual service provider in the aggregate, where it can be retrieved and misused.

Rather, at the time of the transaction, the relevant information is recorded on a user's private profile with a reference number. Furthermore, all the private transaction details are deleted from the service provider's system, including reference numbers, thus achieving a true "forgetful" system. With the subsystem described below, the user has the ability to view transactional details like any other personal content. However, the difference is that the user does not have the ability to edit the transactional detail. By viewing content, the user can also view reference numbers, which can be given to the service provider to access the content for verification, editing or updating purposes. Under this new method, the service provider has access to the content on a "need to know" basis, with access being granted to the service provider to view confidential data after the user provides a reference number which is also known as a "Key Phrase".

Also in connection with the transactions herein, the previously described "efficiency factor" can be enhanced, such as by the user utilizing the scanner on the recycling bin, to enable a list of recycled items to be compiled. Then the list can be used to allow consumers to receive credit from recycling plants or incentives from governmental offices.

Figure 8:
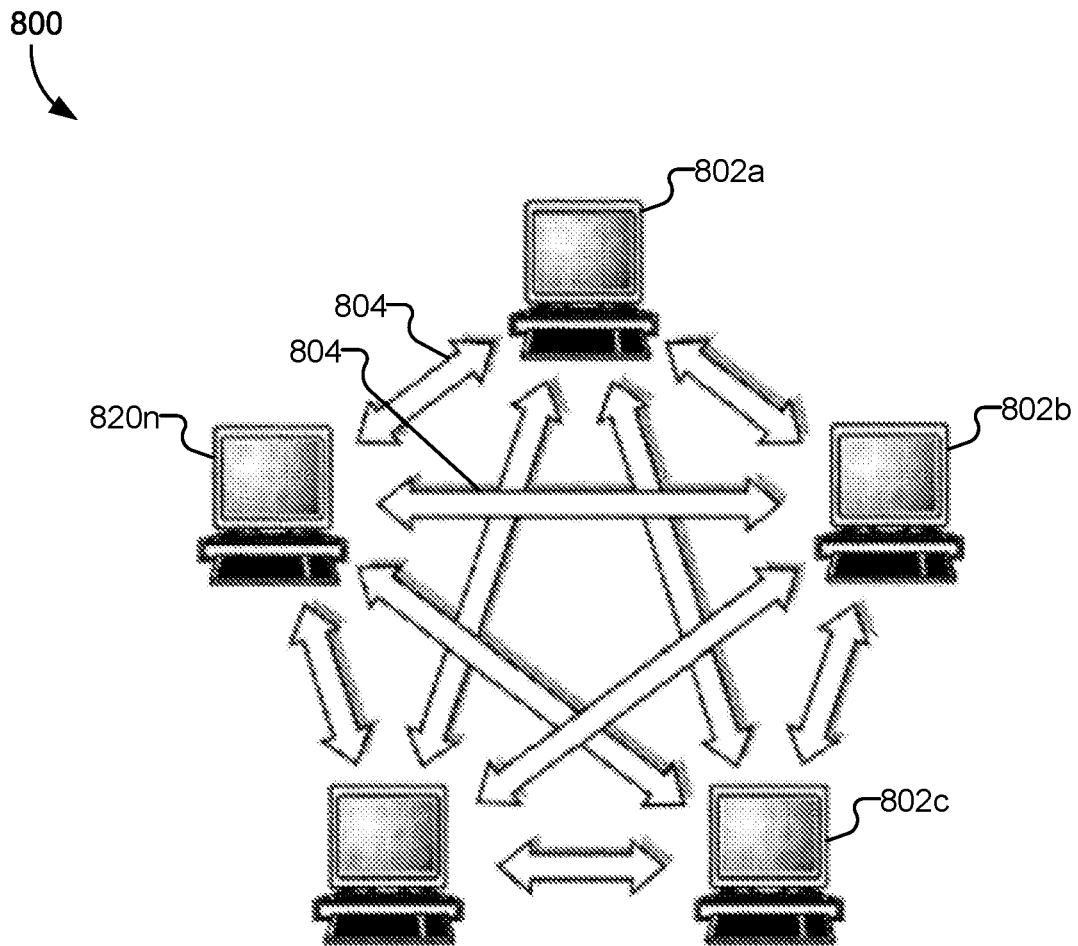
FIG. 8 is a prior art diagram of a peer-to-peer (P2P) networking system that can be used for the purposes of the present invention.

Turning now to the Figures, it is initially noted that FIG. 8 shows the conventional and well known prior art system, known as the Peer-to-Peer (P2P) system which comprises a networking arrangement 800. This network 800 includes a plurality of individual peer computers 802a, 802b, 802c . . . 802n, which can communicate directly with one another, as indicated by the arrows 804 passing therebetween. The P2P computing or networking system comprises a distributive application architecture that partitions tasks or workload between peers. Peers are equally privileged and are equally potent participants in the running of any application. They are said to form a Peer-to-Peer network of nodes.

Peers make a portion of their resources, such as processing part, disc storage, or network bandwidth, directly available to other network participants, without the need for central coordination by servers or stable hosts, as is well known in the art. These user computers are thus both suppliers and consumers of resources, in contrast to the traditional client-server model, where the consumption and supply of resources is always divided. Emerging collaborative P2P systems are going beyond the era of Peers doing similar things while sharing resources, and are being now utilized for diverse Peers that can bring in unique resources and capabilities to a virtual community, thereby empowering it to engage in greater tasks beyond those that can be accomplished by individual Peers, yet are beneficial to all the Peers.

Therefore, in connection with the security factor heretofore described, it can also be stated that, as an alternative method of utilizing the independent non-profit organization, one can use the P2P network configuration, as shown in FIG. 8, where the encrypted "parts" of data and encryption keys from a user are stored on third party users' machines.

Figure 7A:
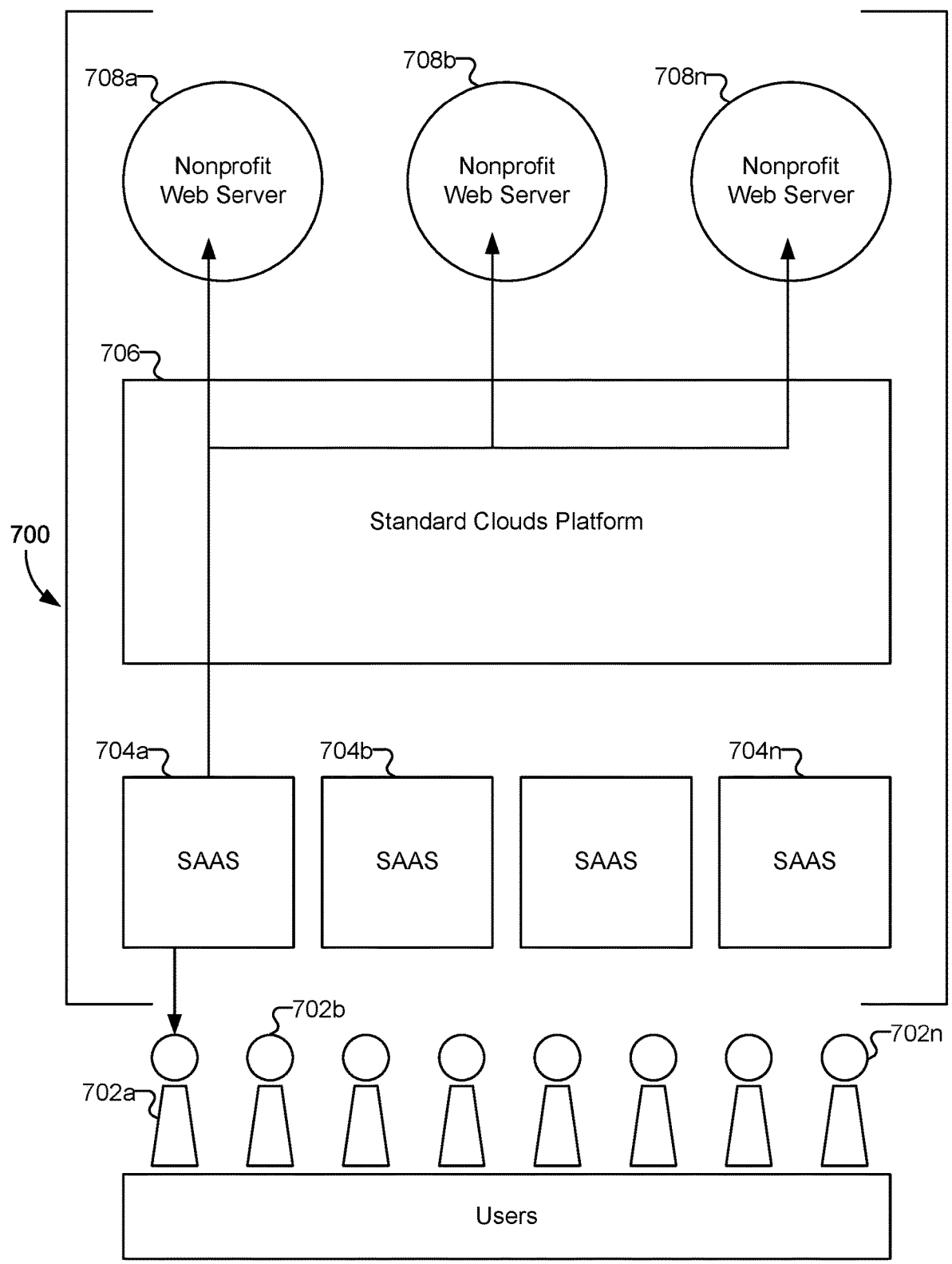
FIGS. 7A and 7B diagrammatically illustrate modes of data storage that make it exceedingly difficult to hack, purloin, and/or invade private information of users, when using the systems of the present invention.
Figure 7B:
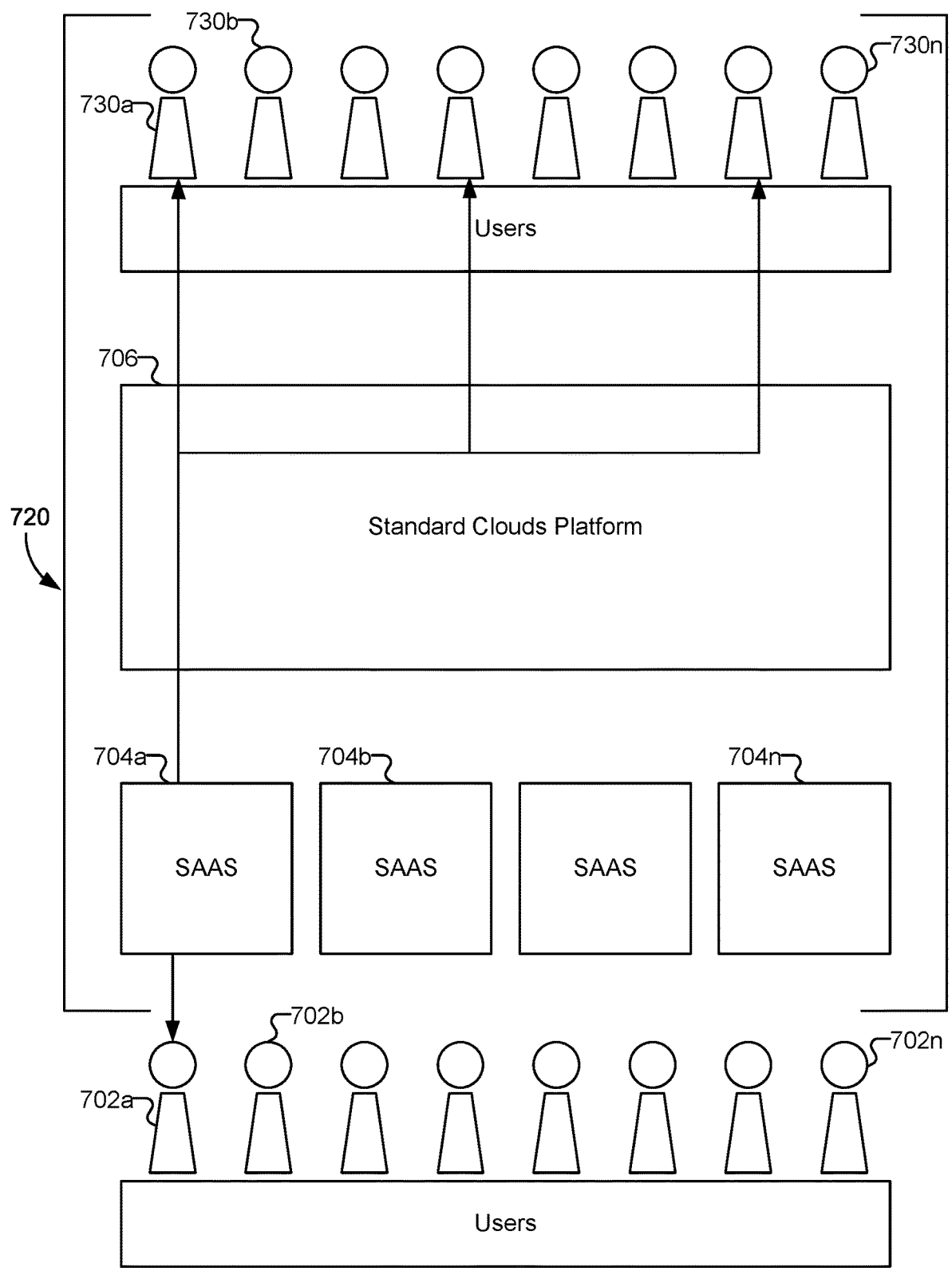

The foregoing can be discerned by comparing FIGS. 7A to 7B.

In FIG. 7A, the users 702a, 702b . . . 702n communicate via their software as a service (SAAS) provider 704a, 704b . . . 704n and via the standard cloud platform 706 with the aforementioned non-profit web servers 708a, 708b . . . 708n.

However, in the more developed P2P type of the invention, the same users 702a, 702b . . . 702n communicate with the aforementioned SAAS providers via the standard cloud platform 706 with users' own computers, each of which provides processing power and storage facilities in their individual computers 730a, 730b . . . 730n, realizing the overall system where the storage and processing power system 720 utilizes the user's own facilities, as described.

It is further noted that the data dissection described above can be processed on either the user's device or on a company's or third party's server which supervises the overall operation.

It is further noted that, for faster service, the data dissection can be performed by data type. In such case, each non-profit third party may be responsible for processing a particular data type, i.e., key phrases, decryption keys, user data content hash tables, and the like. Alternatively, and as noted above, the faster service can be obtained by having the data dissection done by the Peer to Peer computers.

In operation, there is an agent running on the client computer which contains the file to be stored. When making a request to store the file, the agent sends meta data for the file (but not actual data) to the server, which can be a standard cloud or other type of server running service. The server creates and stores a map which contains the information needed to break the file(s) up into segments and to store them in either the public server vaults or in the Peer to Peer vaults, etc. See FIGS. 4A, 4B and 7B. The server then sends a set of instructions back to the client agent, which the agent uses to break the file up and send the segments to the vaults. Data is passed directly from the client computer to the vault. It never passes through the server. The reference to "vault" can be the aforementioned non-profit independent party memory storage or the Peer to Peer storage facilities.

To restore the file, the client agent sends the request to the server. The server retrieves the file's map from its database and sends a set of instructions to the client agent, telling it how to retrieve and reassemble the segments. Data is passed directly from the vaults to the client computer. No data ever passes through the server.

In accordance with yet another aspect of the invention, VPN (Virtual Private Network) where a more secure connection between the servers and the vaults may be necessary, as well as proper for authentication, is provided. Technology to obtain a dual key secure entry can be provided and upgraded as necessary. Similar to accessing saving or vault boxes at banks, where dual keys are utilized, dual authentication is preferably provided herein. In such case, one key is provided from the user and another key is provided from the server, before the vault can be accessed. A user's e-mail can comprise one key, and a dynamic password by the servers may be the other key.

Thus, the invention, as described above, can be referred to as a no footprint system owing to its forgetfulness characteristic. Furthermore, the above-described data dissection system and methodology of the present invention, as well as its forgetful nature, also produced to its user a security amplification unmatched by the prior art.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. A system for storing items, the system comprising:
 a storage location comprising a scanner that is positioned to scan codes from packaging of items as they are placed into the storage location or removed from the storage location;
 a cloud storage system that maintains a list of items in the storage location, wherein the cloud storage system is programmed to:
  receive, from the storage location, the list of items in the storage location;
  analyze usage of the items in the storage location based on a frequency of the items in the storage location being scanned; and generate a forecasted recommendation list of needed items based on the usage; and a trash bin comprising a scanner that is positioned to scan codes from the packaging of the items as they are placed into the trash bin.

2. The system of claim 1, wherein the list of items in the storage location is uploaded to the cloud storage system via a Wi-Fi or LAN connection.

3. The system of claim 1, wherein the list of items in the storage location is stored in a secure vault level of the cloud storage system assigned specifically to a particular user.

4. The system of claim 1, wherein the storage location further comprises an on-board chip that controls the scanner and stores the list of items in the storage location.

5. The system of claim 1, wherein the scanner of the storage location is located on a door of the storage location.

6. The system of claim 1, wherein the cloud storage system is also programmed to process the list of items to determine a lowest available price.

7. The system of claim 6, wherein the lowest available price comprises a local price.

8. The system of claim 6, wherein the lowest available price comprises an online price.

9. The system of claim 1, wherein the cloud storage system is also programmed to process the list of items in the storage location to determine if any coupons are available for the list of items in the storage location.

10. The system of claim 1, wherein the cloud storage system is also programmed to process the list of items in the storage location to determine a closest market location for purchasing one or more items on the list of items in the storage location.

11. The system of claim 1, wherein the cloud storage system is also programmed to download the list of items in the storage location to a mobile device.

12. The system of claim 1, wherein the cloud storage system is also programmed to download the list of items in the storage location to an online shopping cart.

13. The system of claim 1, wherein the scanner of the storage location comprises a laser scanner.

14. The system of claim 1, wherein the scanner of the storage location comprises an RFID scanner.

15. The system of claim 1, wherein the scanner of the storage location comprises a camera.

16. The system of claim 1, wherein the cloud storage system is also programmed to generate a list of items that are not in the storage location but which complement items in the storage location.

17. The system of claim 1, wherein the cloud storage system is also programmed to generate a list of items that are not in the storage location but which are available for sale.

18. The system of claim 1, wherein the storage location further comprises a console located on a door of the storage location that is configured to receive input checking off items from the list of items in the storage location.

19. The system of claim 1, wherein the list of items in the storage location is dissected by the cloud storage system using a randomized algorithm into a plurality of parts that are sent to a plurality of independent data storage locations to protect user data.

20. A method for storing items, the method comprising:
scanning codes from packaging of items as they are placed into a storage location or removed from the storage location using a scanner on the storage location;
maintaining a list of items in the storage location on a cloud storage system;
receiving, at the cloud storage system, the list of items in the storage location from the storage location;
analyzing, at the cloud storage system, usage of the items in the storage location based on a frequency of the items in the storage location being scanned;
generating, at the cloud storage system, a forecasted recommendation list of needed items based on the usage; and
scanning codes from the packaging of the items as they are placed into a trash bin using a scanner on the trash bin.

* * * * *